US012798162B2

(12) United States Patent
Lee

(10) Patent No.: US 12,798,162 B2
(45) Date of Patent: Nov. 17, 2026

(54) POUCH FORMING APPARATUS AND METHOD

(71) Applicant: LG Energy Solution, Ltd., Seoul (KR)

(72) Inventor: Han Young Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/224,097

(22) Filed: May 30, 2025

(65) Prior Publication Data

US 2025/0289168 A1 Sep. 18, 2025

Related U.S. Application Data

(62) Division of application No. 17/801,706, filed as application No. PCT/KR2021/005456 on Apr. 29, 2021, now Pat. No. 12,343,907.

(30) Foreign Application Priority Data

Jun. 4, 2020 (KR) ........................ 10-2020-0067820

(51) Int. Cl.
*B29C 43/00* (2006.01)
*B29C 43/36* (2006.01)
(Continued)

(52) U.S. Cl.
CPC ........... *B29C 43/36* (2013.01); *H01M 50/105* (2021.01); *B29C 2043/3205* (2013.01);
(Continued)

(58) Field of Classification Search
CPC ..... B29C 43/027; B29C 43/36; B29C 43/361; B25C 51/00; B25C 51/082; B25C 51/26; B25C 51/30
See application file for complete search history.

(56) References Cited

U.S. PATENT DOCUMENTS 4,514,353 A 4/1985 Alexander et al.
4,778,439 A 10/1988 Alexander
(Continued)

FOREIGN PATENT DOCUMENTS

CN 110574184 A 12/2019
CN 110635069 A 12/2019
(Continued)

OTHER PUBLICATIONS

Extended European Search Report for Application No. 21816986.0 dated Jun. 27, 2023. 5 pgs.
(Continued)

*Primary Examiner* — Thu Khanh T. Nguyen
(74) *Attorney, Agent, or Firm* — Lerner David LLP

(57) ABSTRACT

The present invention relates to a pouch forming apparatus comprising: a die, in which forming grooves are formed with a partition wall therebetween; and a punch member provided with a punch, which is configured to be inserted into each of the forming grooves to press the pouch film to form a pair of accommodation grooves in the pouch film, wherein the forming groove comprises a vertical space disposed above a forming groove bottom part connected to the partition wall and an inclined space connected to the vertical space and formed by providing an inner wall facing the partition wall, the inner wall defining an inclined surface.

3 Claims, 6 Drawing Sheets

(51) Int. Cl.
*H01M 50/105* (2021.01)
*B29C 43/32* (2006.01)
*B29L 31/34* (2006.01)

(52) U.S. Cl.
CPC ........................... *B29C 2043/3602* (2013.01); *B29C 2043/366* (2013.01); *B29L 2031/3468* (2013.01)

(56) References Cited

U.S. PATENT DOCUMENTS

| | | | | |
|---|---|---|---|---|
| 4,832,676 | A | 5/1989 | Johns et al. | |
| 6,344,162 | B1 | 2/2002 | Miyajima | |
| 8,480,551 | B2 | 7/2013 | Wnek | |
| 10,518,925 | B2 | 12/2019 | Kunihiro et al. | |
| 2010/0143787 | A1 | 6/2010 | Jung et al. | |
| 2011/0287308 | A1 | 11/2011 | Kim et al. | |
| 2012/0055223 | A1 | 3/2012 | Watanabe et al. | |
| 2013/0011721 | A1 | 1/2013 | Kim et al. | |
| 2013/0064998 | A1* | 3/2013 | Wnek .................. | B29D 22/003 428/34.1 |
| 2013/0101894 | A1 | 4/2013 | Baba et al. | |
| 2013/0309346 | A1 | 11/2013 | Jones et al. | |
| 2014/0304980 | A1 | 10/2014 | Kim et al. | |
| 2017/0229682 | A1 | 8/2017 | Fauteux et al. | |
| 2018/0019508 | A1 | 1/2018 | Lee et al. | |
| 2018/0219245 | A1 | 8/2018 | Choi et al. | |
| 2019/0044099 | A1 | 2/2019 | Kang | |
| 2019/0229301 | A1 | 7/2019 | Li et al. | |
| 2019/0305260 | A1 | 10/2019 | Kim et al. | |
| 2019/0366654 | A1 | 12/2019 | Ueno et al. | |
| 2019/0386330 | A1 | 12/2019 | Choi et al. | |
| 2019/0393452 | A1 | 12/2019 | Kim et al. | |
| 2020/0067029 | A1 | 2/2020 | Park et al. | |
| 2020/0111999 | A1 | 4/2020 | Kim et al. | |
| 2020/0112001 | A1 | 4/2020 | Jung et al. | |
| 2020/0168852 | A1 | 5/2020 | Oh et al. | |
| 2020/0331187 | A1 | 10/2020 | Suh et al. | |
| 2020/0403191 | A1 | 12/2020 | Kang | |
| 2021/0086388 | A1 | 3/2021 | Lee et al. | |
| 2021/0344067 | A1 | 11/2021 | Kang | |
| 2022/0102786 | A1 | 3/2022 | Kim et al. | |
| 2023/0006288 | A1 | 1/2023 | Kim et al. | |
| 2023/0330900 | A1 | 10/2023 | Oh et al. | |
| 2025/0023148 | A1 | 1/2025 | Kim et al. | |

FOREIGN PATENT DOCUMENTS

| | | | |
|---|---|---|---|
| CN | 110809507 | A | 2/2020 |
| CN | 110870090 | A | 3/2020 |
| EP | 3584055 | A1 | 12/2019 |
| EP | 3644390 | A1 | 4/2020 |
| JP | 2002361669 | A | 12/2002 |
| JP | 2002367574 | A | 12/2002 |
| JP | 2004071301 | A | 3/2004 |
| JP | 2010509711 | A | 3/2010 |
| KR | 100684845 | B1 | 2/2007 |
| KR | 20070109080 | A | 11/2007 |
| KR | 20080038466 | A | 5/2008 |
| KR | 101243560 | B1 | 3/2013 |
| KR | 101253671 | B1 | 4/2013 |
| KR | 101357319 | B1 | 2/2014 |
| KR | 20160096417 | A | 8/2016 |
| KR | 20170002013 | A | 1/2017 |
| KR | 20170052061 | A | 5/2017 |
| KR | 101801232 | B1 | 11/2017 |
| KR | 20170124882 | A | 11/2017 |
| KR | 101811835 | B1 | 1/2018 |
| KR | 20180062874 | A | 6/2018 |
| KR | 20180071982 | A | 6/2018 |
| KR | 20180071983 | A | 6/2018 |
| KR | 20190024755 | A | 3/2019 |
| KR | 20190090153 | A | 8/2019 |
| KR | 20190093045 | A | 8/2019 |
| KR | 20190098581 | A | 8/2019 |
| KR | 20190105765 | A | 9/2019 |
| KR | 20200000966 | A | 1/2020 |
| KR | 20200061033 | A | 6/2020 |
| WO | 2016006403 | A1 | 1/2016 |
| WO | 2019151638 | A1 | 8/2019 |

OTHER PUBLICATIONS

International Search Report for Application No. PCT/KR2021-005456 mailed Aug. 4, 2021, pp. 1-3.
Search Report dated Dec. 19, 23 from the Office Action for Chinese Application No. 202180018279.4 Issued Dec. 20, 2023, pp. 1-3.

* cited by examiner

POUCH FORMING APPARATUS AND METHOD

CROSS-REFERENCE TO RELATED APPLICATIONS

This application is a divisional of U.S. application Ser. No. 17/801,706, filed on Aug. 23, 2022, now U.S. Patent No. U.S. Pat. No. 12,343,907 B2, which is a national phase entry under 35 U.S.C. § 371 of International Application No. PCT/KR2021/005456, filed on Apr. 29, 2021, which claims priority from Korean Patent Application No. 10-2020-0067820, filed on Jun. 4, 2020, the disclosures of which are incorporated herein by reference.

TECHNICAL FIELD

The present invention relates to a pouch forming apparatus and method, and more particularly, to a pouch forming apparatus and method which prevent cracks from occurring when the pouch is formed.

BACKGROUND ART

In general, secondary batteries refer to chargeable and dischargeable, unlike primary batteries that are not chargeable. Secondary batteries are being widely used for mobile phones, notebook computers, and camcorders, electric vehicles, and the like.

Secondary batteries are classified into a can-type secondary battery, in which an electrode assembly is embedded in a metal can, and a pouch-type secondary battery, in which an electrode assembly is embedded in a pouch. The pouch-type secondary battery comprises an electrode assembly, in which electrodes and a separator are alternately stacked, a pouch, which accommodates the electrode assembly, and an electrode lead coupled to an electrode tab provided in the electrode assembly. Here, the electrode tab and the electrode lead are coupled to each other through welding.

Here, the pouch comprises upper and lower cases in which an accommodation part for accommodating the electrode assembly is formed, and the upper and lower cases are connected to each other by a bent part.

A pouch having such a structure is manufactured by a pouch forming apparatus.

That is, the pouch forming apparatus comprises a die in which a forming groove is formed, with a pouch film disposed in the forming groove, and a punch member comprising a punch provided above the die and inserted into the forming groove of the die to form an electrode assembly accommodation part having a cut shape in the pouch film.

However, in the pouch forming apparatus, when the pouch film is formed to form the accommodation part, an inner wall of the accommodation part is vertically elongated. Here, there is a problem in that cracks occur due to an increase in elongation rate of the inner wall of the accommodation part.

DISCLOSURE OF THE INVENTION

Technical Problem

The present invention is invented to solve the above problem, and an object of the present invention is to significantly reduce an elongation rate of an inner wall of one side of an accommodation part by forming the inner wall of one side of the accommodation part into an inclined surface when forming the accommodation part by forming a pouch film, thereby preventing cracks from occurring.

Technical Solution

A pouch forming apparatus according to the present invention for achieving the above object comprises: a die, in which forming grooves are formed with a partition wall therebetween in a top surface of a pouch film; and a punch member provided with a punch, which is inserted into each of the forming grooves in a state of pressing the pouch film to form a pair of accommodation grooves in the pouch film, wherein the forming groove comprises a vertical space disposed above a forming groove bottom part connected to the partition wall and an inclined space connected to the vertical space and formed by providing one inner wall thereof facing the partition wall as an inclined surface, the punch comprises a vertical block inserted into the vertical space in a state of pressing the pouch film and an inclined block inserted into the inclined space in a state of pressing the pouch film, wherein one surface of the inclined block, which faces the one inner wall, is provided as an inclined surface, and one inner surface of the accommodation groove, which is disposed between the inclined surface of the inclined space and the inclined surface of the inclined block is formed into an inclined surface.

The pouch forming apparatus may further comprise a coupling means configured to detachably couple the inclined block to the vertical block.

The coupling means may comprise a coupling groove formed in the vertical block and a coupling protrusion formed on the inclined block and coupled to the coupling groove.

The inclined block may comprise a first block having an inclined surface at a first angle, a second block having an inclined surface at a second angle, and an n-th block having an n-th inclination angle, and a block having an inclination angle corresponding to the inclined surface of the inclined space among the first, second, and n-th blocks may be coupled to the vertical block.

The inclined block may have an inclination angle of 30° to 60°.

The pouch forming apparatus may further comprise a fixing member configured to fix the inclined block to the punch member.

A finishing member configured to finish a gap between the vertical block and the inclined block may be further provided between the vertical block and the inclined block.

The finishing member may comprise a coupling part coupled to be inserted between the vertical block and the inclined block and a support part configured to support each of bottom surfaces of the vertical block and the inclined block, and a bottom surface of the support part may be disposed on the same horizontal line as the bottom surfaces of the vertical block and the inclined block.

A pouch forming method according to the present invention comprises: a pouch disposition step of disposing a pouch film on a die, in which forming grooves are formed with a partition wall therebetween in a top surface thereof, wherein each of the forming grooves is partitioned into a vertical space disposed above a forming groove bottom part connected to the partition wall and an inclined space connected to the vertical space and formed by providing one inner wall thereof facing the partition wall as an inclined surface; a punch member preparation step of preparing a punch member comprising a punch, wherein the punch comprises a vertical block inserted into the vertical space in a state of pressing the pouch film and an inclined block inserted into the inclined space in a state of pressing the pouch film, and an outer surface of the inclined block, which corresponds to the inclined surface of the inclined space, is provided as an inclined surface; and a pouch forming step of inserting the punch member comprising the punch into each of the forming grooves in the state of pressing the pouch film disposed on the die to form a pair of accommodation grooves in the pouch film, wherein an outer inner wall of the accommodation groove facing the partition wall is formed into an inclined surface by the inclined surface of the inclined block and the inclined surface of the forming groove.

In the punch member preparation step, the inclined block may comprise a first block having an inclined surface at a first angle, a second block having an inclined surface at a second angle, and an n-th block having an n-th inclination angle, and a block having an inclination angle corresponding to the inclined surface of the forming groove among the first, second, and n-th blocks may be coupled to the vertical block.

The punch member preparation step may further comprise a process of fixing the inclined block to the punch member through a fixing member when the inclined block is coupled to the vertical block.

Advantageous Effects

The pouch forming apparatus according to the present invention may comprise the die having the forming groove and the punch member provided with the punch. Here, any one of the side walls of the die and any one or more of the side surfaces of the punch may be provided as the inclined surface to form one or more inclined surfaces of the inner walls of the accommodation part formed in the pouch film. Therefore, the elongation rate of the inner wall of the accommodation part may be significantly reduced to prevent the cracks from occurring in the inner wall of the accommodation part.

That is, in the pouch forming apparatus according to the present invention, the forming groove of the die may form the vertical space and the inclined space, and the punch may comprise the vertical block inserted into the vertical space and the inclined block inserted into the inclined space. Due to the above-described characteristics, when the accommodation groove is formed in the pouch through the die and the punch, the outer inner wall of the accommodation part disposed between the inclined space and the inclined block may be formed as the inclined surface.

Particularly, the forming apparatus for the secondary battery according to the present invention may comprises the coupling means that detachably couples the inclined block to the vertical block. Due to the above-described characteristic, any one of the plurality of inclined blocks having various inclination angles may be used by being coupled to the vertical block, and thus, the accommodation groove having various inclination angles may be formed.

In addition, in the forming apparatus for the secondary battery according to the present invention, the coupling means may comprise the coupling groove and the coupling protrusion, which are respectively provided in the vertical block and on the inclined block. Due to the above-described characteristics, the vertical block and the inclined block may be easily coupled to or separated from each other.

The forming apparatus for the secondary battery according to the present invention may further comprise the fixing member for fixing the vertical block and the inclined block so as not to move. Due to the above-described characteristic, the accident in which the inclined block and the vertical block are separated from each other when the pouch film is formed may be significantly prevented.

MODE FOR CARRYING OUT THE INVENTION

Figure 1:
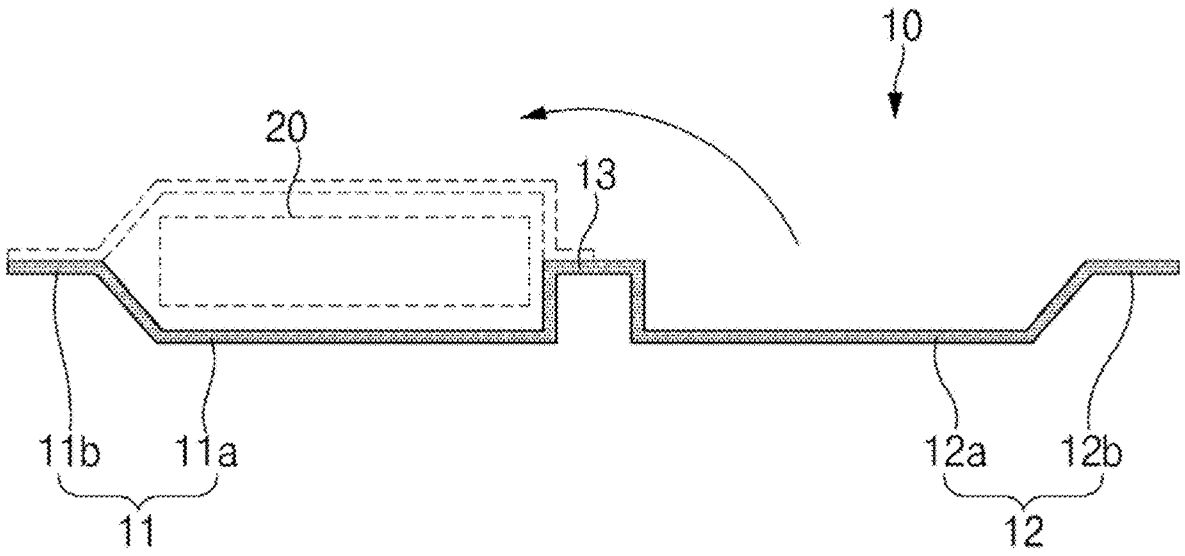
FIG. 1 is a cross-sectional view of a pouch according to a first embodiment of the present invention.
Figure 2:
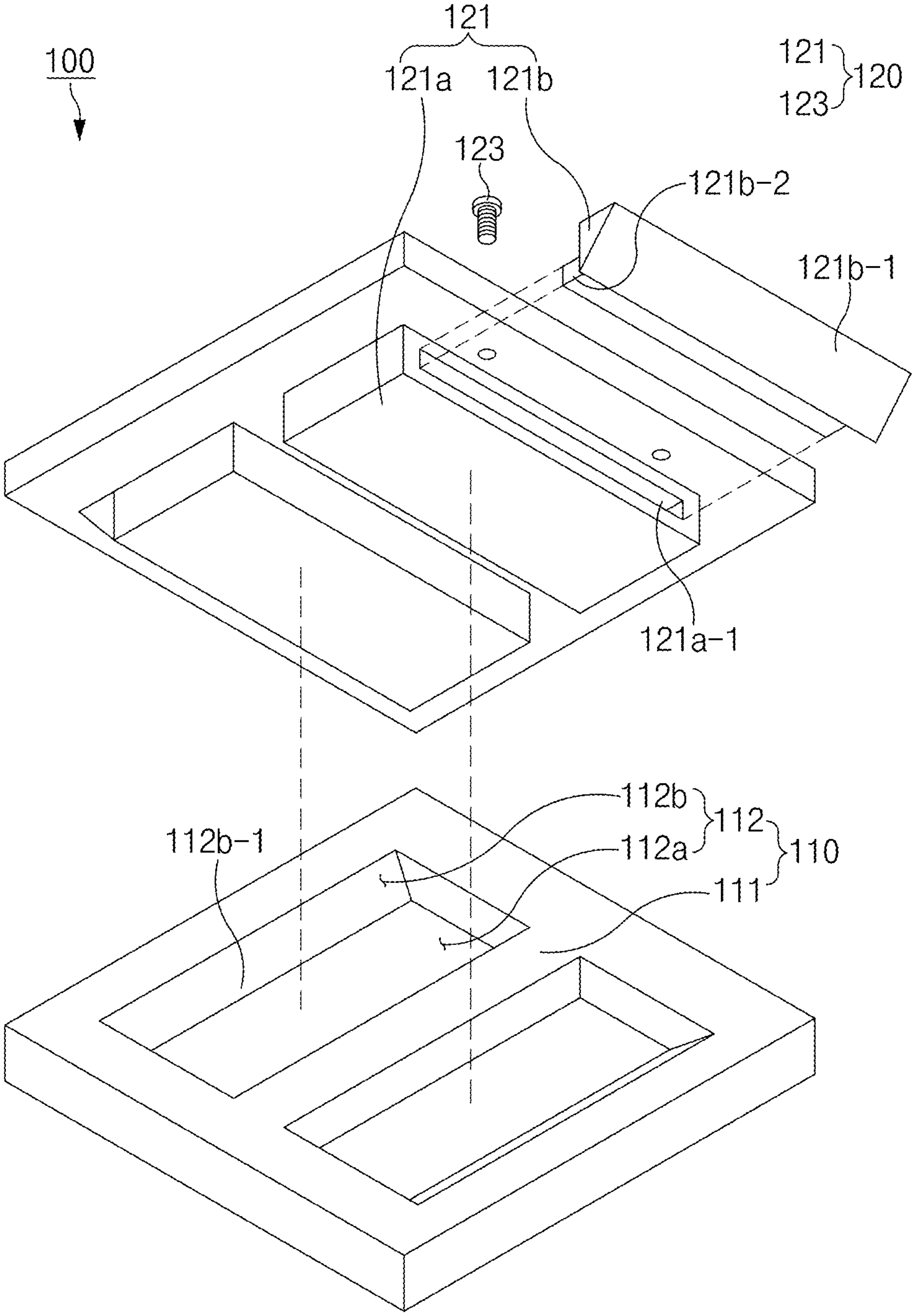
FIG. 2 is an exploded perspective view of a pouch forming apparatus for a secondary battery according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a pouch 10 according to a first embodiment of the present invention is configured to accommodate an electrode assembly and comprises one case 11 accommodating one side of the electrode assembly 20, the other case 12 accommodating the other side of the electrode assembly 20, and a bent part 13 connecting the one case 11 to the other case 12.

The one case 11 comprises one accommodation groove 11*a* accommodating one side of the electrode assembly 20 and one sealing surface 11*b* formed on an edge surface of the one accommodation groove 11*a*, and the other case 12 comprises the other accommodation groove 12*a* accommodating the other side of the electrode assembly 20 and the other sealing surface 12*b* formed on an edge surface of the other accommodation groove 12*a*.

Here, the one and the other accommodation grooves 11*a* and 12*a* are connected to each other to form the accommodation part accommodating the entire electrode assembly 20, and the one and the other sealing surfaces 11*b* and 12*b* are sealed to form a sealing part sealing the accommodation part.

The pouch 10 having the above-described structure is manufactured by the pouch forming apparatus according to the first embodiment of the present invention. Particularly, a pouch forming apparatus according to the first embodiment of the present invention has a structure that prevents cracks from occurring when the pouch is manufactured.

Hereinafter, the pouch forming apparatus according to the first embodiment of the present invention will be described in more detail.

As illustrated in FIGS. 1 to 4, a pouch forming apparatus 100 according to the first embodiment of the present invention is an apparatus for manufacturing a pouch by forming a pouch film. The pouch forming apparatus comprises a die 110, on which a pouch film 10*a* is disposed, and a punch member 120 forming the pouch film 10*a* disposed on the die 110 to manufacture a pouch 10.

In the die 110, grooves 112 having the same size and shape are formed in a top surface, on which the pouch film 10*a* is disposed, with a partition wall 111 therebetween.

The forming groove 112 comprises a vertical space 112*a* or indentation connected to or adjacent the partition wall 111 and, the forming groove 112 having one inner wall 112*b*-1 facing the partition wall 111 as an inclined surface, the inner wall 112*b*-1 adjacent the vertical space 112*a*.

Figure 3:
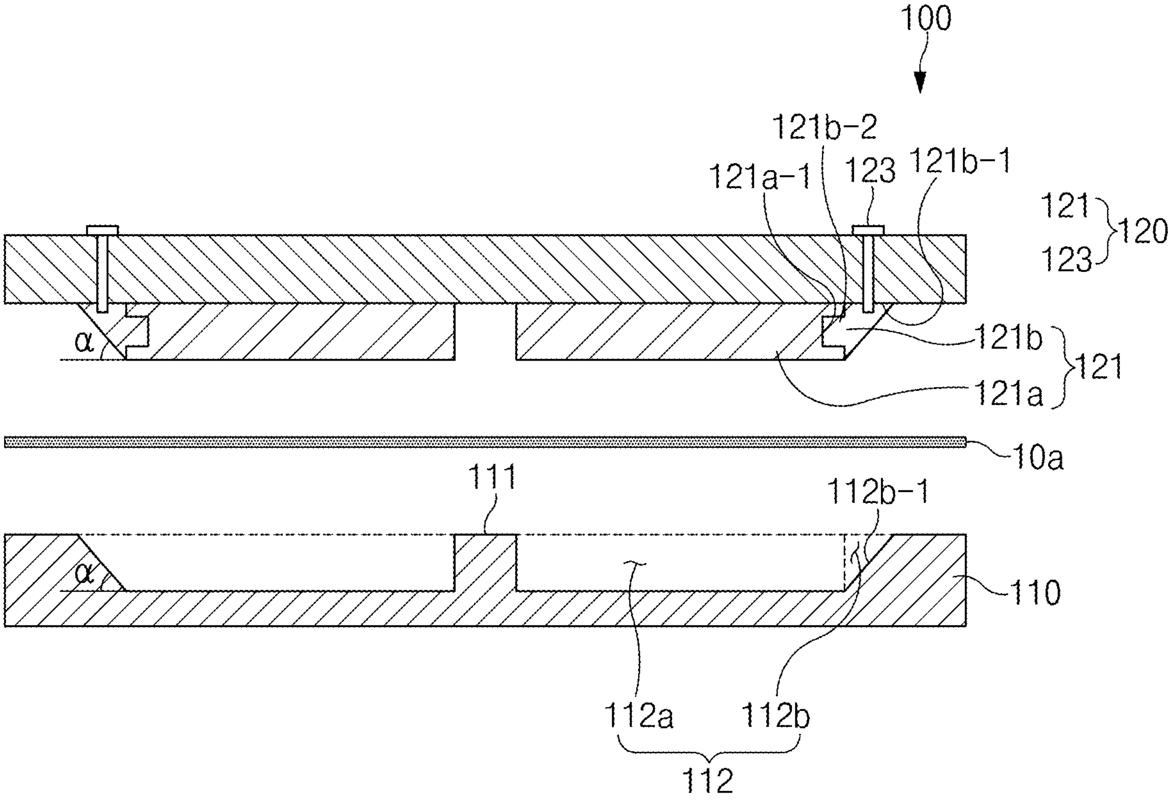
FIG. 3 is a cross-sectional view illustrating a state in which the pouch forming apparatus for the secondary battery, which is illustrated in FIG. 2, is coupled.
Figure 4:
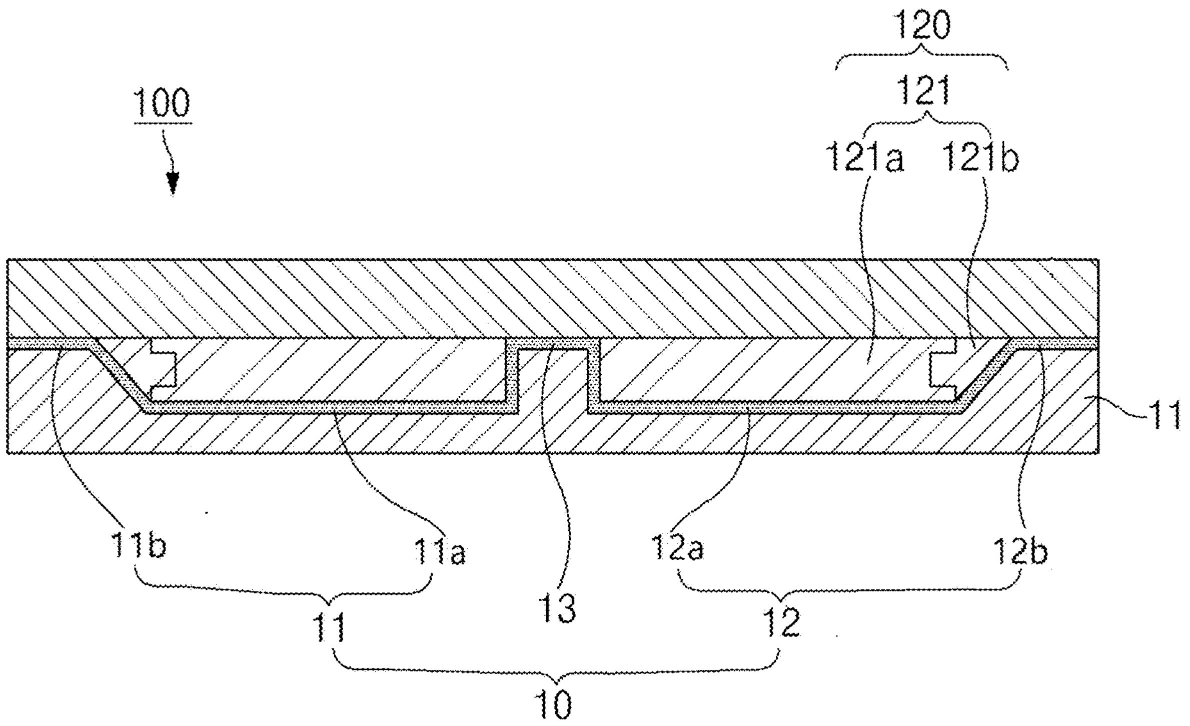
FIG. 4 is a cross-sectional view illustrating a state of use of the pouch forming apparatus for the secondary battery according to the first embodiment of the present invention.

That is, referring to FIG. 3, the forming groove 112 comprises the vertical space 112*a* formed at one side adjacent to the partition wall 111 and the inclined space 112*b* formed at the other side (i.e., adjacent to the vertical space 112*a* on a side of the vertical space 112*a* opposite the partition wall 111), and the vertical space 112*a* and the inclined space 112*b* are connected or adjacent to each other.

Here, referring to FIG. 3, the one inner wall 112*b*-1 of the inclined space 112*b* facing the partition wall 111 is formed as an inclined surface of which a width of the accommodation groove 112 gradually increases from the bottom part to an upper end of the accommodation groove 112.

The punch member 120 comprises a punch 121 that is inserted into each of the forming grooves 121 in a state of pressing the pouch film 10*a* to form a pair of accommodation grooves 11*a* and 12*a* in the pouch film 10*a*.

Here, the punch 121 comprises a vertical block 121*a* inserted into the vertical space 112*a* in the state of pressing the pouch film 10*a* and an inclined block 121*b* inserted into the inclined space 112*b* in the state of pressing the pouch film 10*a*, wherein one surface 121*b*-1 of the inclined block 121*b*, which corresponds to the one inner wall 112*b*-1, is provided as an inclined surface.

That is, the one surface 121*b*-1 of the inclined block 121*b* and the one inner wall 112*b*-1 of the inclined space 112*b* are formed as inclined surfaces having the same inclination angle. The one surface 121*b*-1 of the inclined block 121*b* may correspond to the one inner wall 112*b*-1 of the inclined space 112*b*.

In the pouch forming apparatus 100 according to the first embodiment of the present invention having the above configuration, the pouch film 10*a* is disposed on the top surface of the die 110, and then, when the punch member 120 provided with the punch 121 descends to be in close contact with the pouch film 10*a* disposed on the top surface of the die 110, the punch 121 is inserted into the forming groove 112 of the die 110 to form the pair of accommodation grooves 11*a* and 12*a* in a surface of the pouch film 10*a*. Here, one inner surface of each of the accommodating grooves 11*a* and 12*a* disposed between the inclined surface of the inclined space 112*b* and the inclined surface of the inclined block 121*b* is formed into an inclined surface, and thus, an elongation rate is significantly reduced to prevent cracks from occurring.

The pouch forming apparatus 100 according to the first embodiment of the present invention comprises a coupling means that detachably couples the inclined block 121*b* to the vertical block 121*a*. That is, since the inclined block 121*b* and the vertical block 121*a* are detachably coupled to each other through the coupling means, when the inclined block 121*b* is worn, the worn inclined block 121*b* may be replaced with a new inclined block to improve efficiency of use.

For example, the coupling means comprises a coupling groove 121*a*-1 formed in the vertical block 121*a* and a coupling protrusion 121*b*-2 formed on the inclined block 121*b* and coupled to the coupling groove 121*a*-1. That is, the coupling means may easily couple the vertical block 121*a* to the inclined block 121*b* through the coupling of the coupling groove 121*a*-1 and the coupling protrusion 121*b*-2 and may easily separate the vertical block 121*a* from the inclined block 121*b* through separation of the coupling groove 121*a*-1 and the coupling protrusion 121*b*-2.

An uneven surface or a ledge may be formed on the close contact surface of the coupling groove 121*a*-1 and the coupling protrusion 121*b*-2, and thus, coupling force between the coupling groove 121*a*-1 and the coupling protrusion 121*b*-2 may increase to significantly prevent the coupling force between the coupling groove 121*a*-1 and the coupling protrusion 121*b*-2 from being weakened by external impacts or vibration. In other words, the coupling protrusion 121*b*-2 may extend into the coupling groove 121*a*-1 to improve the strength of the connection between the vertical block 121*a* and the inclined block 121*b*.

The coupling protrusion 121*b*-2 has a hollow portion therein. Thus, when the coupling groove 121*a*-1 and the coupling protrusion 121*b*-2 are coupled to each other, the coupling protrusion 121*b*-2 may be partially pressed in a direction of the hollow and then be deformed. As a result, the coupling groove 121*a*-1 and the coupling protrusion 121*b*-2 may be more easily coupled to each other.

In the pouch forming apparatus 100 according to the first embodiment of the present invention, the inclined block 121*b* comprises a first block having an inclined surface at a first angle, a second block having an inclined surface at a second angle, and an n-th block having an n-th inclination angle. Here, a block having an inclination angle corresponding to the inclined surface of the inclined space among the first, second, and n-th blocks is coupled to the vertical block 121*a*. Thus, the punches having various inclination angles may be obtained, and as a result, an accommodation groove having a desired inclination angle may be formed when manufacturing the pouch.

Here, the inclination angle of the inclined block 121*b* is 30° to 60° with respect to the bottom surface of the accommodation groove, and preferably, the inclined block 121*b* has an inclination angle of 45°. That is, if the inclination angle of the inclined block 121*b* is 30° or less, the occurrence of the cracks may be prevented rather than to the vertical plane, but cracks may occur due to a steep inclination, and if the inclination angle of the inclined block 121*b* is 60° or more, an unnecessary space in which the electrode assembly is not accommodated is greatly expanded to deteriorate battery performance. Thus, the inclination angle of the inclined block 121*b* is formed to be 30° to 60° with respect to the bottom surface of the accommodation groove.

The pouch forming apparatus 100 according to the first embodiment of the present invention further comprises a fixing member 123 for fixing the inclined block 121*b* to the punch member 120.

The fixing member 123 passes through the punch member 120 to fix the inclined block 121*b* by pressing the inclined block 121*b* or by being coupled to the inclined block 121*b*. Thus, the inclined block 121*b* coupled to the vertical block 121*a* may be fixed so as not to be separated.

Hereinafter, a pouch forming method according to the first embodiment of the present invention will be described.

Figure 5:
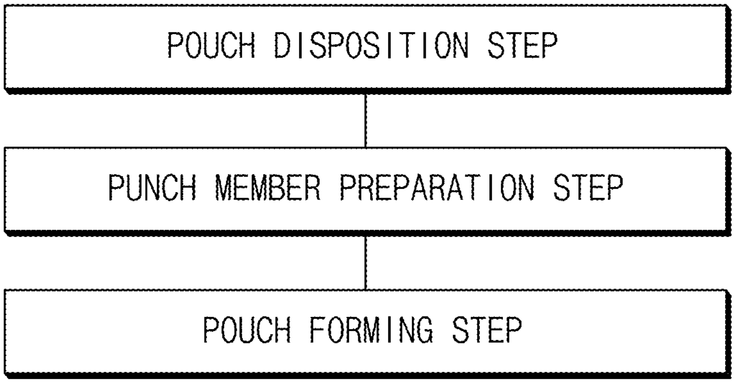
FIG. 5 is a flowchart illustrating a pouch forming method for the secondary battery according to the first embodiment of the present invention.

As illustrated in FIG. 5, a pouch forming method according to the first embodiment of the present invention comprises a pouch disposition step, a punch member preparation step, and a pouch forming step.

Here, the pouch forming method according to the first embodiment of the present invention uses the pouch forming apparatus 100 described above, and the pouch forming apparatus 100 comprises a die 110 and a punch member 120.

In the pouch disposition step, a pouch film 10*a* is disposed on a top surface of the die 110. That is, the pouch film 10*a* is disposed on the top surface of the die 110 in which forming grooves 112 are formed with a partition wall 111 therebetween.

Here, each of the forming grooves 112 is partitioned into a vertical space 112*a* disposed above a bottom part of the forming groove 12 connected to the partition wall 111 and an inclined space 112*b* connected to the vertical space 112*a* and formed by providing an outer inner wall 112*b*-1 facing the partition wall 111 as an inclined surface.

The punch member preparation step prepares the punch member 120 provided with a punch 121.

Here, the punch 121 comprises a vertical block 121*a* inserted into the vertical space 112*a* in a state of pressing the pouch film 10*a* and an inclined block 121*b* inserted into the inclined space 112*b* in a state of pressing the pouch film 10*a*. An outer surface of the inclined block 121*b*, which corresponds to an inclined surface of the inclined space 112*b*, is provided as an inclined surface.

Here, the vertical block 121*a* and the inclined block 121*b* are coupled to each other by a coupling means. That is, the coupling means comprises a coupling groove 121*a*-1 formed in the vertical block 121*a* and a coupling protrusion 121*b*-2 formed on the inclined block 121*b* and coupled to the coupling groove 121*a*-1. The vertical block 121*a* and the inclined block 121*b* may be easily coupled to each other through the coupling groove 121*a*-1 and the coupling protrusion 121*b*-2.

In the punch member preparation step, the inclined block 121*b* comprises a first block having an inclined surface at a first angle, a second block having an inclined surface at a second angle, and an n-th block having an n-th inclination angle. Here, a block having an inclination angle corresponding to the inclined surface of the inclined space among the first, second, and n-th blocks is coupled to the vertical block. Thus, the punch member 120 provided with inclined blocks having various inclination angles may be assembled.

When the coupling of the vertical block 121*a* and the inclined block 121*b* is completed, the punch member preparation step further comprises a process of fixing the inclined block 121*b* to the punch member 120 through the fixing member 123. Thus, the vertical block 121*a* and the inclined block 121*b* may be prevented from being separated from each other by external impacts and vibration.

In the pouch forming step, the pouch film 10*a* disposed on the die 110 is pressed through the punch member 120 provided with the punch 121. Here, a pair of accommodation grooves are formed in the pouch film 10*a* while the punch 121 is inserted into each of the forming grooves 112. Particularly, while an inclined surface of the inclined block 121*b* and an inclined surface of the forming groove are in close contact with each other, an outer inner wall of the accommodation groove facing the partition wall 111 is formed as an inclined surface.

When the pouch forming step is completed as described above, the pouch 10 may be manufactured as illustrated in FIG. 1.

Hereinafter, in describing another embodiment of the present invention, the same reference numerals are used for the same components as those of the above-described embodiment, and duplicated descriptions will be omitted.

Figure 6:
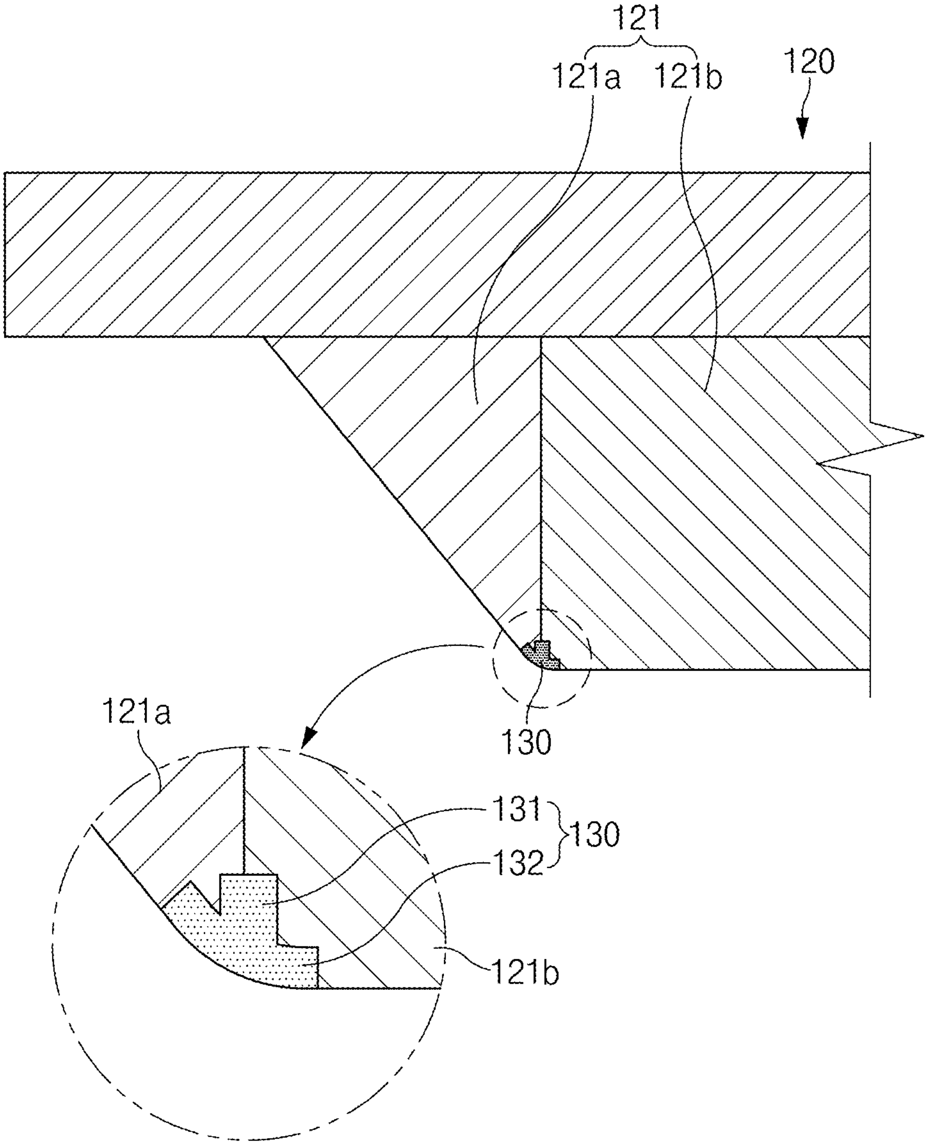
FIG. 6 is a cross-sectional view of a pouch according to a second embodiment of the present invention.

As illustrated in FIG. 6, a pouch forming apparatus 100 according to a second embodiment of the present invention further comprises a finishing member 130 provided between a vertical block 121*a* and an inclined block 121*b* to finish a gap between the vertical block 121*a* and the inclined block 121*b*.

That is, since an uneven surface is formed when the pouch is formed due to the gap between the vertical block 121*a* and the inclined block 121*b*, the finishing member 130 may finish the gap between the vertical block 121*a* and the inclined block 121*b* to prevent the uneven surface from occurring when the pouch is formed.

For example, the finishing member 130 comprises a coupling part 131 that is coupled to be fitted between the vertical block 121*a* and the inclined block 121*b* and a support part 132 supporting each of bottom surfaces of the vertical block 121*a* and the inclined block 121*b*. Here, the support part 132 is inserted into an insertion groove formed in the bottom surface of each of the vertical block 121*a* and the inclined block 121*b* to improve coupling force between the support part 132 and each of the vertical block 121*a* and the inclined block 121*b*.

Particularly, a bottom surface of the support part 132 is disposed on the same horizontal line as the bottom surfaces of the vertical block 121*a* and the inclined block 121*b*, and thus, the support part 132 and each of the vertical block 121*a* and the inclined block 121*b* are prevented from being stepped therebetween.

Therefore, since the pouch forming apparatus 100 according to the second embodiment of the present invention comprises the finishing member 130, the occurrence of the uneven surface may be prevented when the pouch is formed.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Pouch forming apparatus
110: Die
111: Partition wall
112: Forming groove
112*a*: Vertical space
112*b*: Horizontal space
112*b*-1: One inner wall
120: Punch member
121: Punch
121*a*: Vertical block
121*a*-1: Coupling groove
121*b*: inclined block
121*b*-1: One surface
121*b*-2: Coupling protrusion

The invention claimed is:

1. A pouch forming method, comprising:

disposing a pouch film on a die, the die comprising forming grooves formed with a partition wall therebetween along a surface thereof, wherein each of the forming grooves is partitioned into a vertical space disposed above a forming groove bottom part connected to the partition wall, and the die further comprising an inclined space connected to the vertical space and formed by providing an inner wall facing the partition wall, the inner wall defining an inclined surface;

preparing a punch member comprising a punch, wherein the punch comprises a vertical block and an inclined block, and an outer surface of the inclined block, which corresponds to the inclined surface of the inclined space, is provided as an inclined surface, and wherein the punch comprises a coupling means configured to detachably couple the inclined block to the vertical block; and inserting the punch member comprising the punch into each of the forming grooves to press the pouch film disposed on the die to form a pair of accommodation grooves in the pouch film, wherein a wall of the accommodation groove facing the partition wall is formed into an inclined surface by the inclined surface of the inclined block and the inclined surface of the forming groove.

2. The pouch forming method of claim 1, wherein, in the preparing step, the inclined block comprises a first block having an inclined surface at a first angle and a second block having an inclined surface at a second angle, and a block having an inclination angle corresponding to the inclined surface of the forming groove among the first and second blocks is coupled to the vertical block.

3. The pouch forming method of claim 2, wherein the preparing step further comprises a process of fixing the inclined block to the punch member with a fixing member when the inclined block is coupled to the vertical block.

* * * * *